Patented Oct. 16, 1951

2,571,737

UNITED STATES PATENT OFFICE 2,571,737

METHOD OF SULFURIZING TERPENE HYDROCARBONS

Allan Manteuffel, Union, and William D. Gilson, Evanston, Ill., assignors to The Pure Oil Company, Chicago, Ill., a corporation of Ohio No Drawing. Application August 18, 1949, Serial No. 111,084

11 Claims. (Cl. 260—139)

This invention relates to the sulfurization and phosphorization of monocyclic and dicyclic terpene hydrocarbons, and in particular, it relates to a method of preparing a sulfurized-phosphorized terpene hydrocarbon by a particular novel, time-saving, stepwise method, which results in the production of a derivative containing combined sulfur in a larger amount than can be added by conventional methods without the concurrent production of significant amounts of undesirable polymers.

The preparation of sulfurized terpene hydrocarbons involves a reaction of sulfur directly with the hydrocarbon. A common method of preparing the sulfurized products is to react the hydrocarbon with the molten sulfur. This has the difficulty of being substantially a constant temperature reaction conducted at a temperature above the melting point of sulfur, as a result of which it is not possible to follow the course of the reaction to take advantage of its natural characteristics. Also, the high temperature of processing can induce violent reaction which necessitates drastic processing with the reduction of yield in many cases to a level as low as 30 per cent based on the hydrocarbon used.

Accordingly, it is a fundamental object of the instant invention to provide a method of preparing phosphorized-sulfurized terpene hydrocarbons and mixtures of terpene hydrocarbons with fatty materials which will be characterized by smoothness and controllability of the reaction during the sulfurization and the development of a product having a high proportion of combined sulfur.

It is another object of the instant invention to provide a novel method for conducting the sulfurization of terpenes wherein the product of the reaction is developed with substantially no polymer formation.

It is a further object of the invention to provide a step-wise method for the sulfurization of terpenes wherein phosphorized materials are used as sulfurization promoters in the reaction.

Other objects and advantages of the invention will in part be obvious and in part appear hereinafter.

The invention, accordingly, comprises the stepwise method of sulfurizing a monocyclic or dicyclic terpene hydrocarbon having at least one unsaturation by reacting it with about 2 to 5 per cent of phosphorus, for example, as a phosphorus sulfide, and with about 15 to 25 per cent of sulfur and conducting the reaction in a stepwise manner so that the natural course of the reaction is turned to advantage in controlling reaction conditions in the union of sulfur with hydrocarbon to form the desired sulfur derivative. In the process, a portion of the reaction is conducted at about 210° F. to 220° F., following which, the temperature is raised to about 270° to 300° F., and the reaction is completed by maintaining it at the temperature of about 320° F. as a maximum until the desired copper strip corrosion test is developed.

It is possible to prepare sulfurized derivatives of terpene hydrocarbons by reacting the hydrocarbons directly with sulfur. This can be done by simply heating a mixture of the two to an elevated temperature higher than about 300° F., and following the reaction with drastic methods of purification. A variant of the reaction of sulfur directly with the hydrocarbon involves passing liquid hydrocarbon into a body of molten sulfur and thereby producing the sulfurized derivative. Other alternatives involve dilution of the hydrocarbon with an inert solvent and variations of process technique. In these sulfurization processes, considerable amounts of polymer are formed. The process of sulfurization herein disclosed has the distinct advantage over previous methods in that the degree of polymerization can be controlled or virtually eliminated by carefully controlling the course of the reaction.

We have discovered that in the processing of terpene hydrocarbons, it is possible to carry out the sulfurization reaction in such a manner that the formation of the insoluble polymer is reduced to less than a third of the amount of polymer which can be expected in the best conventional process techniques and very often by conducting the process with very accurate control of the reaction, the formation of the polymer can be substantially eliminated.

The process thus embodies the discovery that not only is the phosphorus derivative of the terpene and of certain oleaginous materials a promoter for the sulfurization reaction when it is used in moderate amounts, but the said phosphorus derivative controls the nature and degree of union of sulfur with the terpene hydrocarbon, for there is a relationship between the phosphorus content and the maximum amount of sulfur which will chemically combine with the terpene. That is, the combination of a certain amount of phosphorus with the terpene or oleaginous material makes possible its reaction with an additional amount of sulfur.

Typical materials which can be phosphorized and sulfurized in accordance with the process are alpha and beta pinene, dipentene, terpineol, and terpinolene, and mixtures of fats, such as lard oil, sperm oil, corn oil, wax such as degras and similar materials with such terpenes. For example, in the typical application of the process, a terpene such as alphapinene is charged to the reaction vessel and powdered phosphorus pentasulfide is added slowly to the terpene while it is being stirred. The amount of phosphorus pentasulfide will be about 2 to about 15 percent by weight of the terpene. If phosphorus sesquisulfide is used, the quantity giving an equivalent amount of phosphorus is employed. With the application of heat and raising the temperature to 210° to 220° F., an exothermic reaction occurs which will raise the temperature to about 270° F., without additional heat. After the reaction subsides, 15 to 25 per cent of sulfur is added and an additional exothermic reaction occurs, raising the temperature to about 300° F. With the application of additional heat, the temperature is gradually increased to about 320° F., and at this point an additional exothermic reaction will occur and raise the temperature to about 360° F. The reaction mixture will then be cooled to about 320° to 330° F., maintained at the level for approximately an hour or until a good copper corrosion strip test is developed. However, it is best so to conduct the process that the last exothermic reaction occurs slowly at about 300° to 320° F., and its energy slowly dissipated, thereby to avoid the last temperature elevation and the accompanying polymer formation.

The same course of reaction can be carried out when the phosphorus sulfide and sulfur are added to the terpene simultaneously.

Specific examples of the application of the process, in particular to terpenes and mixtures of terpenes with fats, oils or waxy materials are given herewith:

*Example 1.*—Seventy-five (75) parts of alpha-pinene was reacted with 10 parts phosphorus pentasulfide by first placing the pinene in a flask and heating to about 100° F. At about this temperature, the addition of phosphorus pentasulfide was commenced and continued slowly while the temperature was being raised to about 220° to 230° F. The rate of heating during this period was about two to three degrees per minute and the phosphorus pentasulfide was added completely by the time the mixture had reached 220° F. Heating was continued slowly. At about 230° F. an exothermic reaction occurred and the temperature of the mass was raised to 260° or 270° F. This exothermic reaction was allowed to spend itself and after the reaction had subsided, 15 per cent of sulfur by weight based on the alpha-pinene was added. With the addition of the sulfur, another exothermic reaction occurred, raising the temperature to about 300° F. Upon completion of this exothermic reaction with the sulfur at about 300° F., the temperature of the mass was increased slowly at a rate of about 10° F., per hour, to about 320° F. to complete the reaction and to dissipate the energy of an additional exothermic reaction which can occur between 320° and 330° F. By following this procedure of raising the temperature slowly following the last addition of sulfur and reaction at about 300° F., the energy of the reaction is dissipated and the formation of polymers is substantially avoided.

Upon completion of the reaction in this stepwise fashion, the sulfurized pinene was recovered and it was found that the amount of oil-insoluble polymer formed was less than 3 per cent of the weight of the terpene used and that substantially all the sulfur, therefore, had been consumed by reaction with the terpene. The product contained 20.6 per cent of sulfur and 3.12 per cent of phosphorus. A copper strip corrosion test indicated that the sulfur had combined with the terpene for it produced only a tarnish coating on the copper at 320° F.

*Example 2.*—Substantially the same process as that described in connection with Example 1 was carried out with reactants composed of 51 parts of alpha-pinene containing dissolved therein 34 parts of wool grease and the ingredients were reacted with 3 parts of phosphorus sesquisulfide and 12 parts of sulfur. The finishing reaction by which the sulfur was reacted with the phosphorized pinene-wool grease combination involved reaction of the mixture with sulfur for 6 hours at about 300° F. The product obtained contained 11.4 per cent of sulfur and 1.02 per cent of phosphorus with a showing of no polymer.

*Example 3.*—Forty-three (43) parts of alpha-pinene and 43 parts of Number 1 lard oil were added to a flask and heated to about 100° F. Two (2) parts of phosphorus sesquisulfide was added. The temperature was raised to about 150° F. and 12 parts of sulfur was added slowly. The temperature was raised slowly, 2 to 3 degrees per minute, up to 300° F. where it was maintained for seven hours.

Upon completion of the reaction in this fashion, the sulfurized pinene-lard oil was recovered and it was found that no polymer was formed and that substantially all the sulfur, therefore, had been consumed by the reaction with the terpene-lard oil mixture. The product contained 12.5 per cent of sulfur and 1.1 per cent of phosphorus. A copper strip corrosion test indicated that the sulfur had combined with the terpene for it produced a very slight tight black coating on the copper at 300° F.

*Example 4.*—Forty-three (43) parts of lard oil was phosphorized for 2½ hours at 225° F. with 2 per cent of phosphorus sesquisulfide. Following this, there was added thereto 43 parts of alpha-pinene and 12 parts of sulfur and the solution raised at a rate of 2 to 3 degrees per minute to a temperature of about 300° F. The mixture was held at this temperature for about 5 hours, following which the temperature was raised to about 330° F., where it was held for about 8 hours. The product recovered was free of polymer and contained 11.7 per cent of sulfur, 1.2 per cent of phosphorus and gave a tight black coating in the copper strip corrosion test.

The procedure described in the examples, whereby the terpene or the terpene-fat mixture is reacted in temperature stages with a phosphorus sulfide and sulfur is generally applicable to terpenes. Thus, about 65 parts of dipentene can be reacted with about 10 parts of phosphorus pentasulfide, by first adding the dipentene to a flask and heating it to about 100° F., following which a phosphorus sulfide is added and the temperature raised to about 220° to 230° F. As indicated in the examples, normally the rate of heating during this period should be about 2° to 3° per minute. Following the addition of the phosphorus sulfide, heating is continued slowly to bring the temperature of the mixture to about 260° or 270° F. In this operation, an exothermic reaction will occur which is allowed to spend itself and then about 25 per cent of sulfur based on the weight of the dipentene is added and another exothermic reaction thus induced, whereby the temperature is raised to about 300° F. Upon completion of this reaction, the temperature of the mass is increased to about 320° F. to complete the reaction. Where the synthesis is carried out in this fashion, it will be found that the product will contain about 20 per cent or more of sulfur and 2 per cent or more of phosphorus; it will give a very light stain in the copper corrosion strip test. The product is also free of polymers.

It is possible to apply the method described to the preparation of a phosphorized terpene concentrate to be used as a promoter for the sulfurization of additional terpene by reacting about 50 parts of terpene with about 10 to 15 parts of phosphorus pentasulfide, for example, and carrying out the reaction to incorporate as much phosphorus into the compound as will enter. Upon completion of the phosphorization at about 220° F., additional terpene to the amount necessary for preparing the desired derivative can be added and the entire batch sulfurized to incorporate therein about 20 parts of sulfur. The terpene concentrate formed will serve to promote the sulfurization, not only of additional terpene of the same kind, but also the sulfurization of other terpene hydrocarbons.

It will be apparent from the above examples that reaction of the unsaturated terpene-type material alone or in admixture with non-drying materials containing unsaturations or functional groups reactable with a phosphorus sulfide, such as fats, oils or waxes, can be carried out so that advantage can be taken of the promoting effect of the phosphorized derivative in improving the activity of the sulfur with the material. Also, reaction with the phosphorus sesquisulfide or phosphorus pentasulfide can be carried out to incorporate about 3 per cent of phosphorus into the compound. There is a relationship between the amount of phosphorus and the amount of sulfur which can be incorporated in the compound to the extent that for a high sulfur content derivative, it is desirable to start with a large amount of phosphorus in the first step. Thus, if the preliminary reaction is carried out to react about 2 per cent of phosphorus sesquisulfide with the material, about 15 per cent of sulfur will be the maximum combinable amount which can be added to give the desired copper strip corrosion test. Correspondingly, if about 5 per cent of phosphorus sesquisulfide is reacted with the compound in the beginning, it appears to make it possible to add about 25 per cent of sulfur.

The products described above may be used as additives as prepared or after stripping off the unreacted or low boiling constituents.

Though the examples which are shown demonstrate only the reaction in the process as applied specifically to pinene and dipentene, the manipulation is substantially the same for all of the monocyclic and dicyclic terpene hydrocarbons containing one unsaturation which makes them reactable with phosphorus and sulfur so that included within the family which can be treated by the process are the various terpenes, pinenes, fenchenes, camphenes and the like. Similarly, with respect to the fatty material which can be sulfurized and phosphorized together with the terpene, there can be included such animal and vegetable fats, oils and waxes as are commonly called non-drying oils containing functional groups reactable with phosphorus and sulfur. These include lard oil, corn oil, rapeseed oil, sunflower oil and waxes, such as degras and sperm oil.

What is claimed is:

1. The method of sulfurizing monocyclic and dicyclic terpene hydrocarbons having at least one unsaturation comprising, reacting a sulfide of phosphorus and sulfur with a material from the group consisting of monocyclic and dicyclic terpene hydrocarbons having at least one unsaturation, and mixtures thereof with fatty oils and waxes containing unsaturations and functional groups reactable with phosphorus sulfides, and conducting said reaction at a temperature of about 200° to 230° F. and approaching said reaction temperature by heating the reaction mixture slowly at a rate not exceeding about 2° to 3° F. per minute, thereby inducing a first exothermic reaction, permitting the said first exothermic reaction to raise the temperature of the reaction mixture to about 270° F., adding sulfur upon the substantial completion of said first exothermic reaction and thereby inducing a second exothermic reaction, permitting said second exothermic reaction to raise the temperature to about 300° F., subsequently gradually raising the temperature from about 300° to about 320° F., and maintaining the reaction in that range until good copper strip corrosion is obtained, when a test sample thereof is subjected to the copper strip test for one minute at 300° F.

2. The method of sulfurizing monocyclic and dicyclic terpene hydrocarbons having at least one unsaturation comprising, reacting a sulfide of phosphorus with the hydrocarbon at a temperature of about 200° to 230° F., and approaching said reaction temperature by heating the reaction mixture at a rate not exceeding about 2° to 3° F. per minute, thereby to induce a first exothermic reaction, permitting the said first exothermic reaction to raise the temperature of the mixture to about 270° F., adding sulfur upon the substantial completion of said first exothermic reaction and thereby inducing a second exothermic reaction, permitting said second exothermic reaction to raise the temperature to about 300° F., subsequently gradually raising the temperature from about 300° F. to 320° F., and maintaining the reaction in that range until good copper strip corrosion is obtained, when a test sample thereof is subjected to the copper strip test for one minute at 300° F.

3. The method in accordance with claim 2 in which the terpene hydrocarbon is pinene.

4. The method in accordance with claim 2 in which the terpene hydrocarbon is dipentene.

5. The method in accordance with claim 2 in which the material to be sulfurized and phosphorized is a mixture of terpene hydrocarbon and fat.

6. The method in accordance with claim 2 in which the rate of heating subsequent to the second exothermic reaction is about 10° F. per hour.

7. The method of sulfurizing monocyclic and dicyclic terpene hydrocarbons having at least one unsaturation comprising, reacting a sulfide of phosphorous with a fatty material at a temperature of about 220° to 230° F., and approaching said reaction temperature by heating the mixture at a rate not exceeding about 2° to 3° F. per minute, completing the reaction and adding to the phosphorized material one to two parts of terpene hydrocarbon for each part of material and adding sulfur, raising the temperature to about 250° to 270° F., at a rate of about 2° to 3° F. per minute, thereby to induce an exothermic reaction and permitting said exothermic reaction to raise the temperature to about 300° F., and subsequently gradually raising the temperature from about 300° F. to 320° F., and maintaining the reaction temperature in that range until a good copper strip corrosion is obtained when a test sample thereof is subjected to the copper strip test for one minute at 300° F.

8. The method in accordance with claim 7 in which the terpene hydrocarbon is pinene and the fatty material is No. 1 lard oil.

9. The method in accordance with claim 7 in which the terpene hydrocarbon is dipentene and the fatty material is lard oil.

10. The method in accordance with claim 7 in which the terpene hydrocarbon is pinene and the fatty material is wool grease.

11. The method in accordance with claim 7 in which the rate of heating subsequent to the second exothermic reaction is about 10° F. per hour.

ALLAN MANTEUFFEL.
WILLIAM D. GILSON.

REFERENCES CITED

The following references are of record in the file of this patent:

UNITED STATES PATENTS

| Number | Name | Date |
|---|---|---|
| 1,974,299 | Churchill | Sept. 18, 1934 |
| 2,246,281 | Zimmer et al. | June 17, 1941 |
| 2,246,282 | Zimmer et al. | June 17, 1941 |
| 2,405,607 | Rogers | Aug. 13, 1946 |